(12) United States Patent
Satoh et al.

(10) Patent No.: US 9,094,214 B2
(45) Date of Patent: Jul. 28, 2015

(54) ELECTRONIC CERTIFICATE ISSUE SYSTEM AND METHOD

(75) Inventors: Jun Satoh, Tokyo (JP); Masami Nasu, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 422 days.

(21) Appl. No.: 12/419,345

(22) Filed: Apr. 7, 2009

(65) Prior Publication Data

US 2009/0265545 A1 Oct. 22, 2009

(30) Foreign Application Priority Data

Apr. 17, 2008 (JP) .................................. 2008-107890

(51) Int. Cl.
*H04L 9/32* (2006.01)
(52) U.S. Cl.
CPC ............ *H04L 9/3263* (2013.01); *H04L 9/3273* (2013.01); *H04L 2209/56* (2013.01)
(58) Field of Classification Search
USPC .......................................................... 726/6
See application file for complete search history.

(56) References Cited

U.S. PATENT DOCUMENTS

| | | | | |
|---|---|---|---|---|
| 6,169,976 | B1* | 1/2001 | Colosso ........................... | 705/59 |
| 6,219,652 | B1* | 4/2001 | Carter et al. ..................... | 705/59 |
| 7,415,721 | B2* | 8/2008 | Fransdonk ........................ | 726/4 |
| 7,433,847 | B2* | 10/2008 | Pauly ............................... | 705/60 |
| 7,680,742 | B1* | 3/2010 | Ackerman et al. .............. | 705/59 |
| 7,706,540 | B2* | 4/2010 | Fransdonk ...................... | 380/279 |
| 7,730,306 | B2* | 6/2010 | Fujino ............................. | 713/168 |
| 2003/0149670 | A1* | 8/2003 | Cronne ............................ | 705/59 |
| 2003/0163684 | A1* | 8/2003 | Fransdonk ...................... | 713/153 |
| 2003/0165241 | A1* | 9/2003 | Fransdonk ...................... | 380/258 |
| 2004/0128395 | A1* | 7/2004 | Miyazaki ........................ | 709/229 |
| 2005/0131832 | A1* | 6/2005 | Fransdonk ....................... | 705/59 |
| 2006/0064390 | A1* | 3/2006 | Pauly ............................... | 705/60 |
| 2006/0193474 | A1* | 8/2006 | Fransdonk ...................... | 380/279 |
| 2006/0210084 | A1* | 9/2006 | Fransdonk ...................... | 380/278 |
| 2006/0282393 | A1* | 12/2006 | Sladek et al. ................... | 705/59 |
| 2007/0192868 | A1* | 8/2007 | Fujino ............................. | 726/26 |
| 2007/0257813 | A1* | 11/2007 | Vaswani et al. ........... | 340/870.02 |
| 2008/0092221 | A1* | 4/2008 | Tan et al. ......................... | 726/10 |
| 2008/0319779 | A1* | 12/2008 | Hughes et al. .................... | 705/1 |
| 2009/0326964 | A1* | 12/2009 | Garg et al. ........................ | 705/1 |

FOREIGN PATENT DOCUMENTS

JP 2004-320715 11/2004

* cited by examiner

*Primary Examiner* — Lisa Lewis
*Assistant Examiner* — Henry Tsang
(74) *Attorney, Agent, or Firm* — IPUSA, PLLC

(57) ABSTRACT

A registration part receives a product key of a program for performing a communication using a private key and a public key, and discrimination information of a computer using the program. The registration part registers in a management part, when an authentication of a license corresponding to the product key is completed in success, correspondence information between the product key and the discrimination information and other discrimination information regarding the correspondence information. A discrimination information sending part returns the other discrimination information to an electronic certificate issue apparatus. A checking part receives the other discrimination information and check whether the other discrimination information is registered in the management part. A certificate producing part produces, when the other discrimination information is registered in the management part, an individual certificate package containing the private key and the public key for each piece of the other discrimination information.

12 Claims, 14 Drawing Sheets

FIG.5

| PRODUCT KEY | HARDWARE INFORMATION | SERIAL NUMBER | INVALID FLAG |
|---|---|---|---|
| ... | ... | ... | |
| | | | |
| | | | |

51

ELECTRONIC CERTIFICATE ISSUE SYSTEM AND METHOD

BACKGROUND OF THE INVENTION

1. Field of the Invention

The present invention relates to an electronic certificate issue system and method.

2. Description of the Related Art

Conventionally, there is a system (hereinafter, referred to as "remote monitoring system") to monitor an image forming apparatus, such as a copy machine, a printer or a multifunction peripheral device installed in an office, through a network by a company providing maintenance services, such as a manufacturer of the image forming apparatus. Such a remote monitoring system generally includes an equipment information collecting apparatus, which collects equipment information from an image forming apparatus, installed on a user side and a server apparatus installed on a maintenance service company side. The equipment information collecting apparatus collects equipment information from an image forming apparatus. The collected equipment information is transferred from the equipment information collecting apparatus to the server apparatus through a network. There is a case where the image forming apparatus directly transfers the equipment information of the image forming apparatus.

Because the equipment information may be used for an accounting operation and may contain confidential information, the equipment information must be transferred through a secure communication. Thus, in order to prevent data tampering or spoofing, mutual authentication by SSL (Secure Socket Layer) and enciphered communication are performed between a client apparatus (the equipment information collecting apparatus or the image forming apparatus) and a server apparatus.

In order to perform the mutual authentication, the client apparatus and the server apparatus need to have a private key, respectively. The private key is a piece of information, which must not be revealed by any means in order to maintain the security of the remote monitoring system. Moreover, it is required that the key is only introduced to clients authorized by the maintenance service company.

In a conventional remote monitoring system, basically, an apparatus used as a client apparatus is provided with a public key certificate and a private key that are unique for each apparatus when delivered from a factory. That is, an apparatus (incorporative apparatus), into which a unique public key certificate and a private key are previously incorporated and which is not a general purpose computer such as a personal computer, is used not only for the image forming apparatus used as a client apparatus but also for the above-mentioned equipment information collecting apparatus.

Therefore, it is possible to record a private key or the like in each client apparatus at the time of factory shipment so that the private key cannot be taken out of the client apparatus, thereby maintaining the uniqueness of the private key and the security.

The above-mentioned conventional system is disclosed, for example, in Patent Document 1.

Patent Document 1: Japanese Laid-Open Patent Application No. 2004-320715

However, the limitation of the apparatus serving as the equipment information collecting apparatus to such an incorporative apparatus deteriorates system flexibility. Thus, it is desired to achieve the function of the equipment information collecting apparatus by using software, which can be installed in a general purpose computer such as a personal computer (PC) or the like.

However, when distributing such a software package through a network or recording media such as a CD-ROM, the software package is produced by copying the software. Accordingly, there is a problem in that it is difficult to safely introduce a private key or the like, which is unique for each software package, into a PC to which the software is installed.

Moreover, when delivering the software package through a network, it is possible even for a malicious person to easily acquire the software. Thus, a risk of attacking the server apparatus using the thus-acquired software may become high.

SUMMARY OF THE INVENTION

It is a general object of the present invention to provide an electronic certificate issue system and method in which the above-mentioned problems are eliminated.

A more specific object of the present invention is to provide an electronic certificate issue system that is capable of appropriately assigning an electronic certificate unique to each copy of a program to be distributed.

In order to achieve the object, there is provided according to one aspect of the present invention an electronic certificate issue system including: a registration part configured to receive a product key of a program for performing a communication using a private key and a public key, and discrimination information of a computer using the program, the registration part registering in a management part, when an authentication of a license corresponding to the product key is completed in success, correspondence information between the product key and the discrimination information and other discrimination information regarding the correspondence information; a discrimination information sending part configured to return the other discrimination information to an electronic certificate issue apparatus; a checking part configured to receive the other discrimination information and check whether the other discrimination information is registered in the management part; and certificate producing part configured to produce, when the other discrimination information is registered in the management part, an individual certificate package containing the private key and the public key for each piece of the other discrimination information.

According to the above-mentioned electronic certificate issue system, an electronic certificate unique to each of copies of the program to be distributed can be appropriately assigned.

Other objects, features and advantages of the present invention will become more apparent from the following detailed description when read in conjunction with the accompanying drawings.

BRIEF DESCRIPTION OF THE DRAWINGS

FIG. 5 is an illustration of a structure of an activation management table;

DETAILED DESCRIPTION OF THE PREFERRED EMBODIMENTS

A description will be given below, with reference to the drawings, of embodiments of the present invention.

Figure 1:
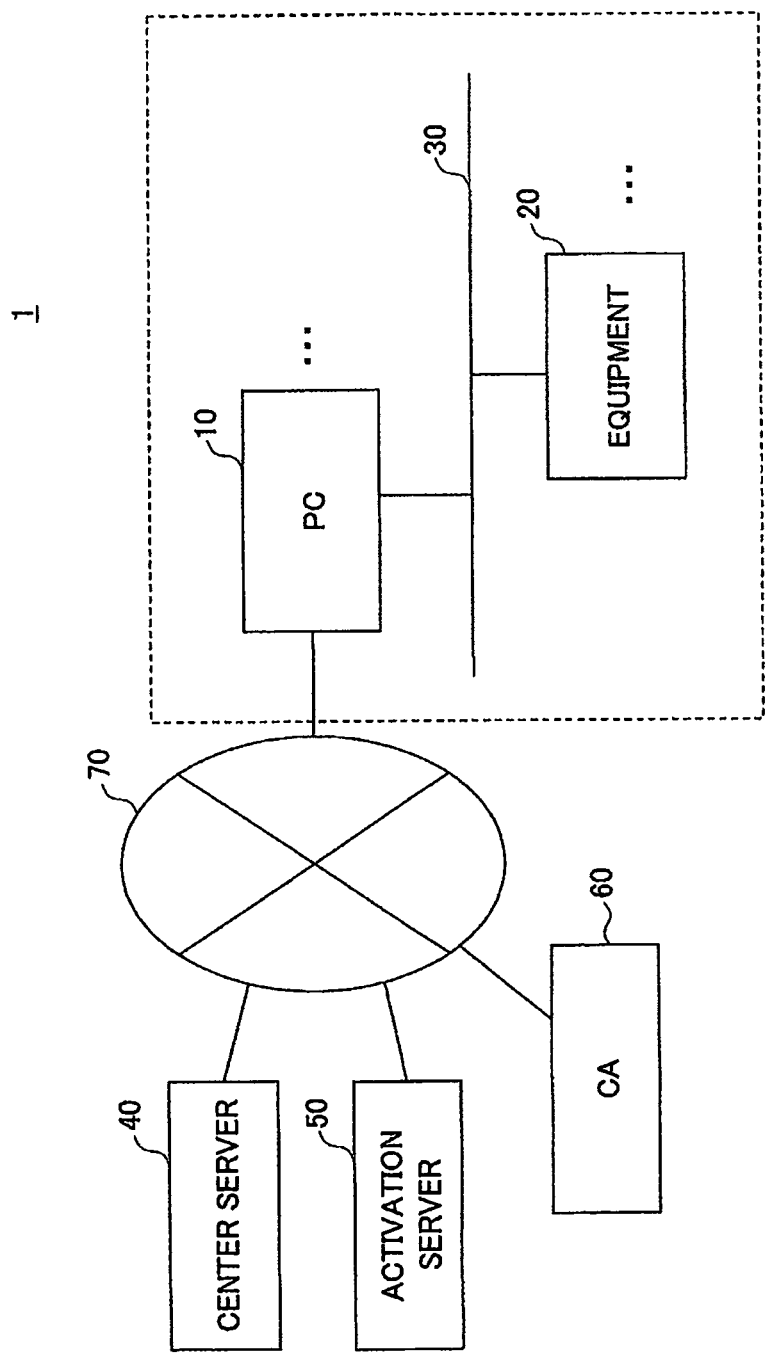
FIG. 1 is an illustration of an equipment monitoring system according to an embodiment of the present invention.

FIG. 1 is an illustration of an equipment monitoring system according to an embodiment of the present invention. In FIG. 1, the equipment monitoring system 1 includes at least one personal computer (PC) 10, at least one equipment 20, a center server 40, an activation server 50 and a certificate authority (CA) 60. The PC 10 and the equipment 20 are connected to each other through a network 30 (either wired or wireless) such as, for example, a local area network (LAN). The PC 10, the center server 40, the activation server 50 and the CA 60 are connected to each other through a network 70 such as, for example, the Internet.

The PC 10 and the equipment 20 are installed in the user site of the apparatus 20 (such as an office where the equipment 20 is installed). The equipment 20 is, for example, an image forming apparatus such as a copy machine, a printer, a facsimile, a multifunction peripheral device or the like. The equipment 20 corresponds to an object to be monitored in the equipment monitoring system 1. The PC 10 collects information regarding objects to be monitored from the equipment 20. The information regarding objects to be monitored includes information regarding various counter values and information regarding operating conditions of the equipment 20. Hereinafter, the information regarding objects to be monitored is referred to as "equipment information". The equipment 20 transfers the collected equipment information to the center sever 40 by an enciphered communication after mutual authentication (such as, for example, a secure socket layer (SSL) communication). There may be a plurality of user sites. In the PC 10, the function to collect the equipment information and transfer the equipment information to the center server 40 is achieved by an equipment information notification program.

The center server 40 belongs to a monitoring site of the equipment 20 (for example, a maintenance service provider of the equipment such as a manufacturer of the equipment 20). The center server 40 is a computer, which can provide equipment monitoring service such as receiving the equipment information from the PC 10 and accumulating the received equipment information in a normal operation of the equipment monitoring system 1. Also, the center server 40 mediates the PC 10 and the CA 60 in a process of acquiring safety in the communication between the PC 10 and the center server 40, which is performed before starting monitoring of the equipment 20. Specifically, the center server 40 requests the CA 60 to issue data (hereinafter, referred to as "individual certificate package") containing a private key associated with each PC 10 and a public key certificate in response to a request from the PC 10, and returns to the PC 10 the individual certificate package, which is issued to the CA 60. The private key and the public key certificate (individual certificate package) are used for the mutual authentication and the enciphered communication with the center server 40 when the PC 10 transfers the equipment information. In the present embodiment, the individual certificate package is a package of an electronic certificate based on the Public Key Cryptography Standards (PKSC).

The activation server 50 performs an activation with respect to the equipment information notification program. The activation includes a confirmation of having an authorized license, that is, an authentication of a license.

The CA 60 is a so-called authentication office, and includes one or more computers performing an issue of the above-mentioned individual certificate package. In the present embodiment, the CA 60 provides uniqueness of the individual certificate package in association with the activation server 50, and prevents an issue of the individual certificate package to a client (PC 10) having no license.

Figure 2:
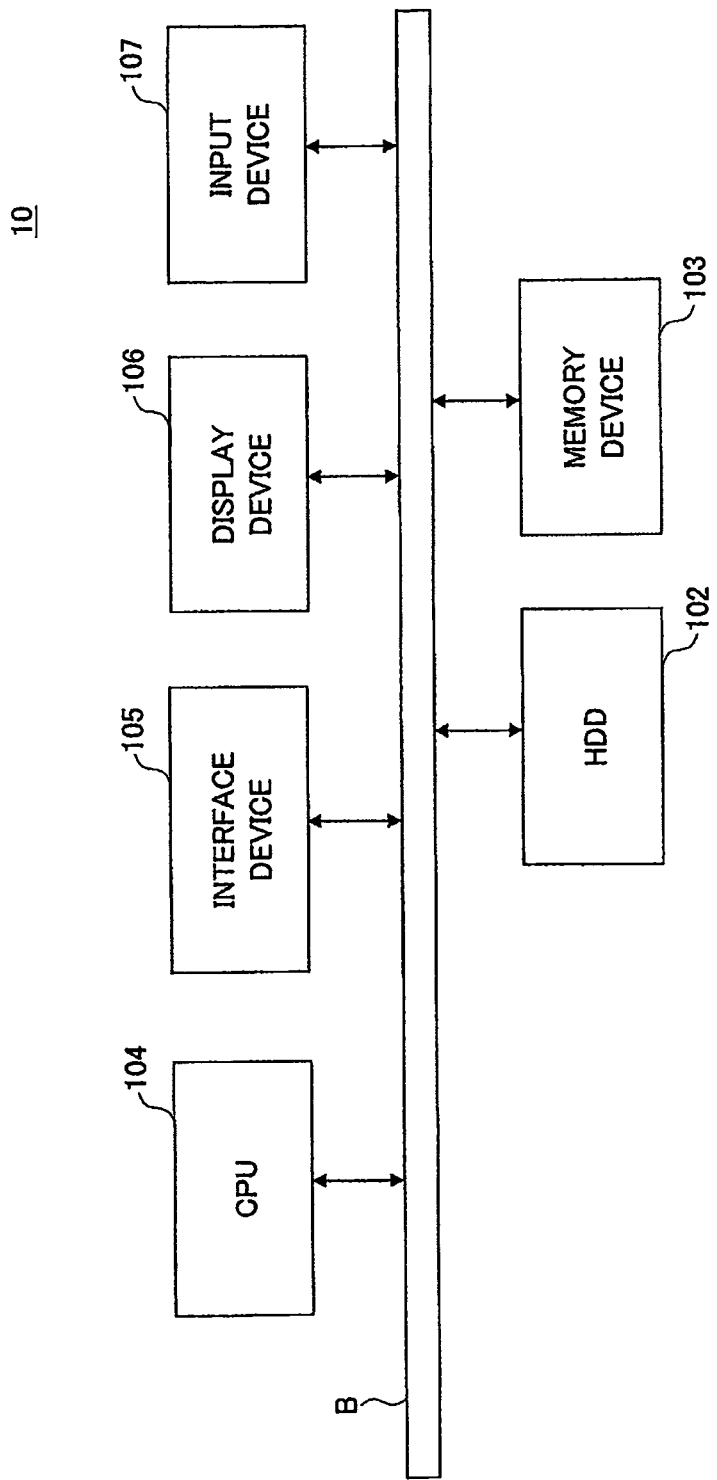
FIG. 2 is a block diagram illustrating a hardware structure of a personal computer illustrated in FIG. 1.

FIG. 2 is a block diagram illustrating a hardware structure of the personal computer (PC) according to the present embodiment. The PC 10 illustrated in FIG. 2 is equipped with a hard disk drive (HDD) 102, a memory device 103, a central processing unit (CPU) 104, an interface device 105, a display device 106 and an input device 107.

The program (equipment information notification program), which realizes the process performed in the PC 10, is downloaded through the network, and is installed in the HDD 102. The HDD 102 stores the installed equipment information notification program, and also stores necessary files and data.

Upon reception of an instruction to boot the equipment information notification program, the memory device 103 reads the equipment information notification program from the HDD 102 and stores the equipment information notification program therein. The CPU 104 realizes the function of the PC 10 according to the equipment information notification program stored in the memory device 103. The interface device 105 is used as an interface for connecting the PC 10 to the network. The display device 106 displays a graphical user interface (GUI) according to the equipment information notification program. The input device 107 includes a keyboard, a mouse, etc., and used for inputting various operation instructions.

The installation of the equipment information notification program is not always performed through the network. For example, the installation of the equipment information notification program may be performed using recording media such as a CD-ROM or an SD card.

The center server 40, the activation server 50 and the CA 60 have the same hardware structure as the PC 10 as illustrated in FIG. 2 except that these devices are not necessarily equipped with the display device 106 and the input device 107.

Figure 3:
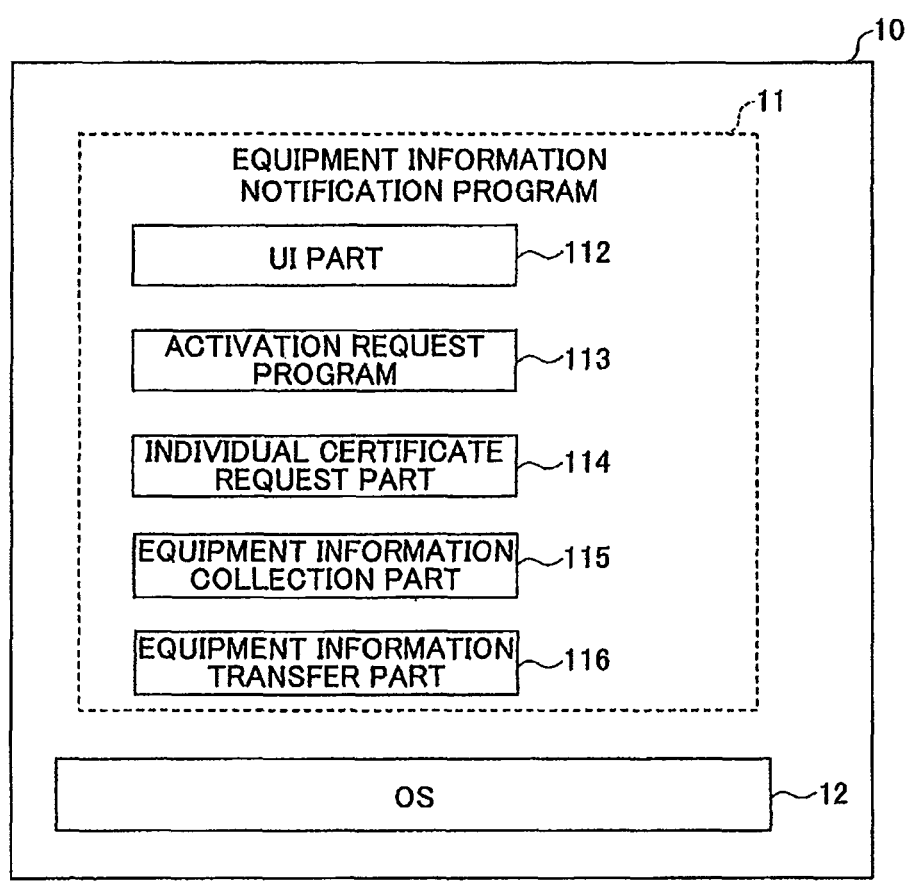
FIG. 3 is an illustration of a functional structure of a personal computer according to a first embodiment.

FIG. 3 is an illustration of a functional structure of the personal computer according to a first embodiment. In FIG. 3, the equipment information notification program 11 runs on the operating system (OS) 12 to cause the PC 10 to serve as a user interface (UI) part 112, an activation request part 113, an individual certificate request part 114, an equipment information collection part 115 and an equipment information transfer part 116.

The UI part 112 displays the graphical user interface (GUI) on the display device 106 to detect a user request and provide information to a user. The activation request part 113 requests the activation server of an activation of the equipment information notification program 11. The individual certificate request part 114 requests the center server 40 to issue an individual certificate package in response to a result of the activation. The equipment information collection part 115 collects the equipment information from the equipment 20 connected to the network 30. The equipment information transfer part 116 transmits the collected equipment information to the center server 40. The equipment information transfer part 116 performs a mutual authentication and an enciphered communication using the individual certificate package.

The identification information (for example, an IP address, a host name or URL of each) for communication with the center server 40, the activation server 50 and the CA 60 is saved in the HDD 102 at a position where the equipment information notification program 11 can recognize the identification information.

Figure 4:
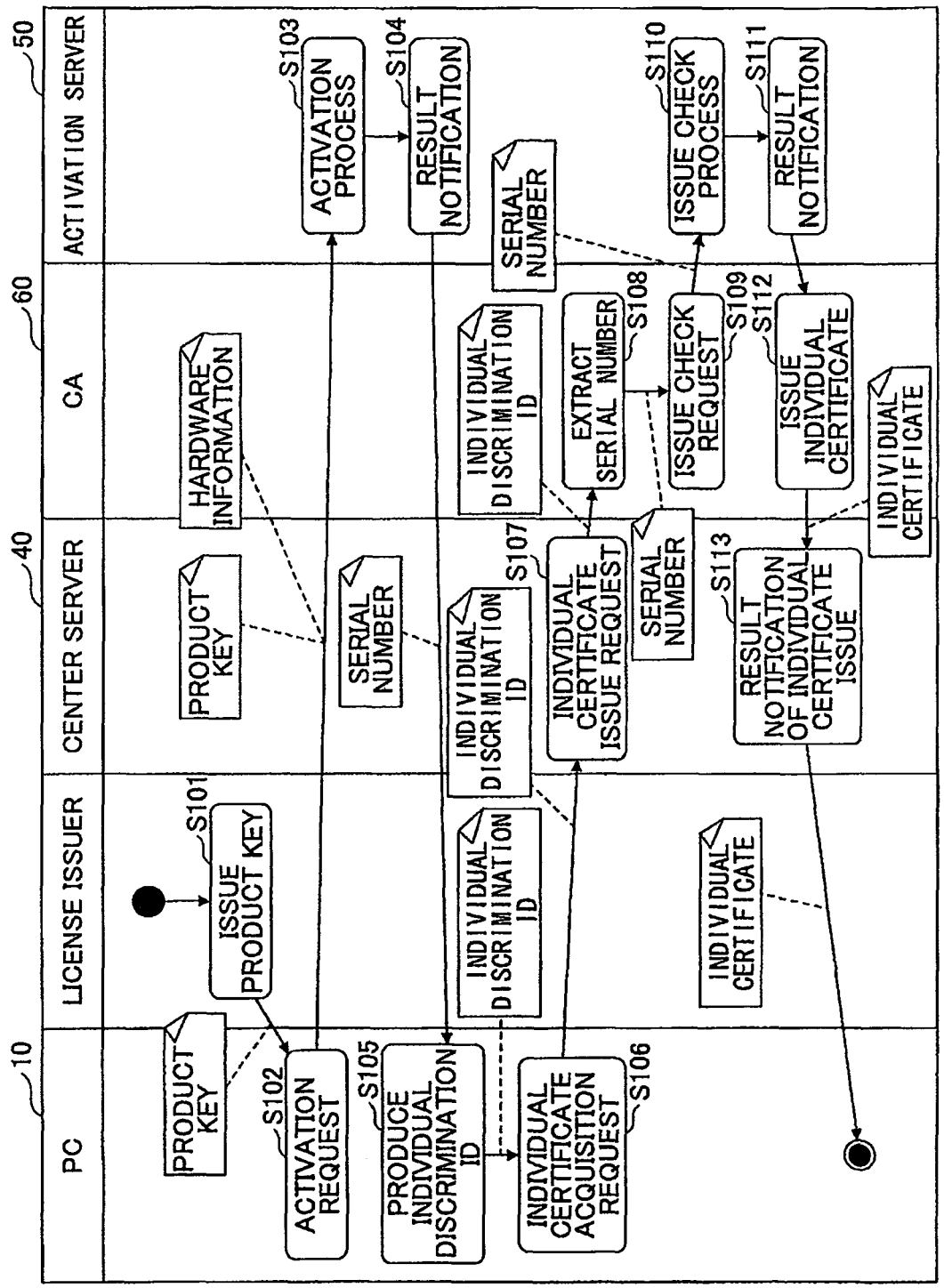
FIG. 4 is an illustration for explaining a process of issuing an individual certificate package according to the first embodiment.

A description will be given below of a process procedure of the equipment monitoring system 1. FIG. 4 is an illustration for explaining a process of issuing the individual certificate package according to the first embodiment. The process in each device is performed according to a control by a program installed in the device.

In step S101, a user of the PC 10 (hereinafter, simply referred to as "user") receives a product key (license key) issued by an issuer of a license of the equipment information notification program 11, the product key corresponding to the license of the equipment information notification program 11. For example, the product key is issued when purchasing the license. There is no limitation to the purchase of the license and the issue of the product key. The purchase of the license and the issue of the product key may be performed through a network such as the Internet or may be performed using a recording medium (including a paper). The product key is unique to each license.

Then, if the user inputs the product key through a screen displayed by the UI part 112, the activation request part 113 sends, in step S102, an activation request (a use application) of the equipment information notification program 11 to the activation server 50. The product key and the hardware information of the PC 10 are included in the activation request. The hardware information is information for uniquely and physically identifying the PC 10, such as a MAC address of the PC 10, a serial number of the CPU, a serial number of the memory, etc. The activation request part 113 acquires the hardware information from the PC 10. The UI part 112 saves the input product key at a predetermined position of the HDD 102.

Upon reception of the product key and the hardware information from the PC 10, the activation server 50 performs, in step S103, an activation process (an authentication of a license) in accordance with an activation management table.

FIG. 5 is an illustration of a structure of the activation management table. In FIG. 5, the activation management table 51 is a table (information) for managing a serial number and an invalid flag for each set (pair) of the activated product key (of which license has been authenticated) and the hardware information, and is stored in a memory device of the activation server 50.

Accordingly, the activation server 50 performs the authentication of the license by determining whether the received product key has been registered in the activation management table 51 in association with other hardware information, that is, whether the equipment information notification program 11 is used in another PC 10 based on the same product key. However, if the license corresponding to the received product key permits simultaneous use by a plurality of PCs 10, the activation server 50 authenticates the license by determining whether a plurality of pieces of different hardware information has already been registered in the activation management table 51 in association with the received product key. Information for specifying the number of licenses may be contained in the product ID or may be acquired from a computer of the license issuer in accordance with the product ID.

If a plurality of pieces of different hardware information has not been registered in the activation management table 51 in association with the received product key (that is, an activation corresponding to the number licenses has not been performed yet), the activation server 50 authenticates the license corresponding to the received product key and the hardware information (determines that the license is legitimate), and resisters the product key and the hardware information in the activation management table 51 by associating the product key and the hardware information with each other. Additionally, the activation server 50 produces a serial number, which is an item of discriminating information unique to the set (pair) of the product key and the hardware information, and registers the serial number in the activation management table 51 by associating the serial number and the set (pair) of the product key and the hardware information with each other.

Then, in step S104, the activation server 50 transmits (issues) the serial number to the PC 10. If the authentication of the license failed (if the activation corresponding to the number of licenses has been already performed), the activation server 50 sends information indicating the failure of the activation to the PC 10. That is, the serial number is issued only when the activation is completed successfully.

Then, the individual certificate request part 114 of the PC 10 produces, in step S105, an individual discrimination ID by performing a reversible conversion on a combination of a model ID and the serial number. The model ID is an ID given to the equipment information notification program 11. That is, the model ID has a value common to all the equipment information notification programs 11 distributed. Then, the individual certificate request part 114 requests, in step S106, an issue of the individual certificate package by sending the individual discrimination ID to the center server 40.

The center server 40 transfers, in step S107, an issue request of the received individual discrimination ID and the individual certificate package to the CA 60. The CA 60 extracts, in step S108, the serial number from the received individual discrimination ID, and inquires, in step S109, whether the serial number has been issued (whether the serial number was issued justly) by sending the serial number to the activation server 50. The activation server 50 determines, in step S110, whether the serial number has been issued in accordance with the activation management table 51. If the serial number is registered in the activation management table 51, the activation server 50 determines that the serial number has been issued. On the other hand, if the serial number is not registered in the activation management table 51, the activation server 50 determines that the serial number has not been issued. The activation server 50 returns, in step S111, the result of the determination to the CA 60.

If the serial number is already an issued serial number, the CA 60 produces a unique individual certificate package associated with the individual discrimination ID (the equipment information notification program 11 of the PC 10), and returns, in step S112, the produced individual certificate package to the center server 40.

Figure 6:
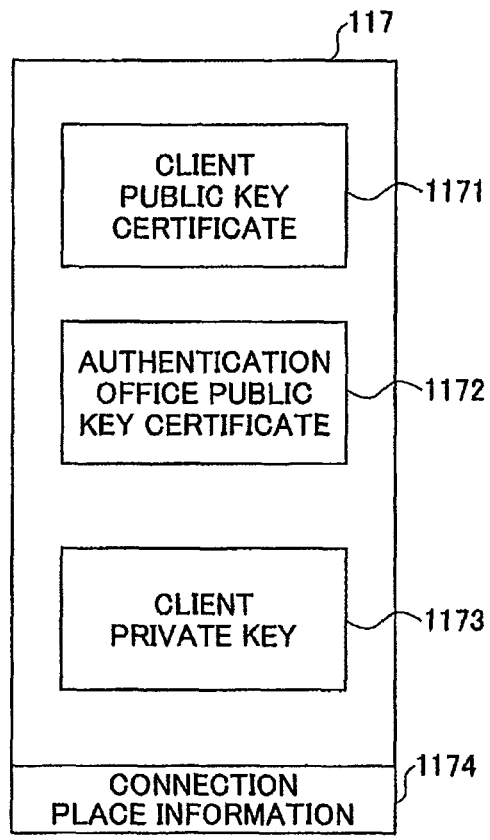
FIG. 6 is an illustration showing a structure of the individual certificate package.

FIG. 6 is an illustration showing a structure of the individual certificate package. As illustrated in FIG. 6, the individual certificate package 117 includes a client public key certificate 1171, an authentication office public key certificate 1172, a client private key 1173, and connection place information 1174. The client public key certificate 1171 and the client private key 1173 are used as a public key certificate and a private key on the side of the PC 10 in a mutual authentication and an enciphered communication with the center servers 40. The authentication office public key certificate 1172 is a public key certificate of the CA 60. The connection place information 1174 is identification information of a connection place by the enciphered communication using the individual certificate package 117. In the present embodiment, the IP address of the center server 40 corresponds to the connection place information 1174.

The CA 60 also registers the individual discrimination ID in a certificate issue history list, the individual discrimination ID being rendered to be an object to which the individual certificate package 117 is issued.

Figure 7:
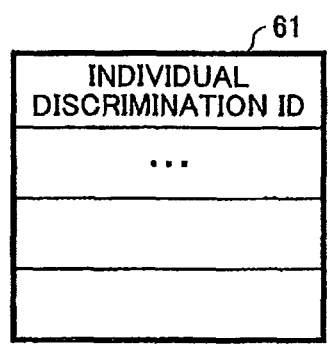
FIG. 7 is an illustration showing a structure of a certificate issue history list.

FIG. 7 is an illustration showing a structure of the certificate issue history list. As illustrated in FIG. 7, the certificate issue history list 61 is a list of the individual discrimination IDs to which the individual certificate package 171 was issued, and is stored, for example, in the memory device of the CA 60.

Then, upon reception of the individual certificate package 117, the center server 40 transfers, in step S113, the individual certificate package 117 to the PC 10. The individual certificate request part 114 of the PC 10 stores the transmitted individual certificate package 117 at a predetermined position of the HDD 102.

The transmission of the equipment information collected by the equipment information collection part 115 to the center server 40 from the equipment information transfer part 116 is achieved by the equipment information notification program 11 in the PC 10 being activated and the individual certificate package 117 being introduced into the PC 10. When transferring the equipment information, the equipment information transfer part 116 sends the product key and the hardware information saved in the HDD 102 to the activation server 50, and inquires whether an execution is permitted. The activation server 50 permits an execution if the product key and the hardware information concerned are registered in the activation management table 51.

When the execution is permitted, the equipment information transfer part 116 executes the mutual authentication according to an SSL (Secure Socket Layer) as mentioned below by using the individual certificate package 117.

Figure 8:
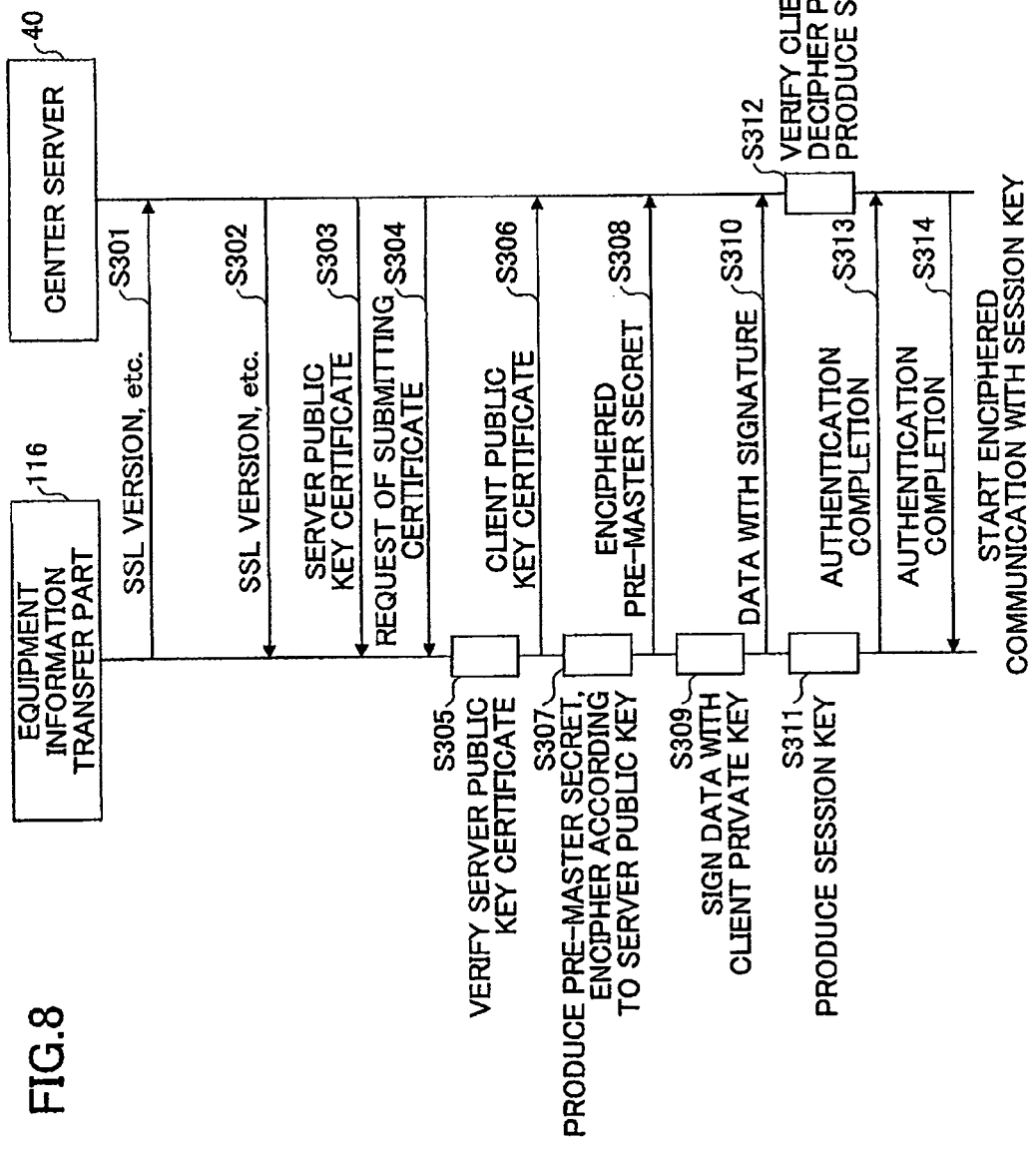
FIG. 8 is a sequence chart for explaining an authentication process according to an SSL using the individual certificate package.

FIG. 8 is a sequence chart for explaining an authentication process according to the SSL using the individual certificate package. In the authentication process, it is assumed that the certificate package is introduced also into the center server 40. That is, in the present embodiment, a peculiar certificate package was previously introduced (saved) in the center server 40. The certificate package contains a public key certificate (server public key certificate) associated with and peculiar to the center server 40, a private key (server private key) associated with the center server 40, and a public key certificate of the authentication office 60.

At the time of start of communication, the equipment information transfer part 116 sends, in step S301, an SSL version number, a code set supported, a random number, etc., to the center server 40. Then, the center server 40 sends, in step S302, the SSL version number, a code set to be used, a random number, etc., to the equipment information transfer part 116. Then, the center server 40 requests, in step S303, the equipment information transfer part 116 to submit the certificate. Thereafter, the center server 40 waits for a response from the equipment information transfer part 116.

Upon reception of the server public key certificate, the equipment information transfer part 116 verifies, in step S305, the server public key certificate concerned using the authentication office public key certificate 1172. If the justification of the server public key certificate is confirmed, the equipment information transfer part 116 sends, in step S306, the client public key certificate 1171 to the center server 40. Then, the equipment information transfer part 116 enciphers, in step S307, a pre-master secret code (random number) calculated from a hash value of data, which has been exchanged thus far, according to the server public key. Then, the equipment information transfer part 116 sends, in step S308, the enciphered pre-master secret code to the center server 40. Then, the equipment information transfer part 116 signs, in step S309, the random number data calculated using the data exchanged thus far with the client private key. Then, the equipment information transfer part 116 sends, in step S310, the signed random number data to the center server 40. Then, the equipment information transfer part 116 produces, in step S311, a session key in accordance with two seeds and the pre-master secret code.

Then, the center server 40 verifies, in step S312, the received client public key certificate 1171 using the authentication office public key certificate, which the center server 40 possesses. Additionally, the center server 40 verifies, in step S312, the data with the signature using the client public key certificate 1171. Further, the center server 40 creates, in step S312, the session key from the pre-master secret code and the two seeds which are deciphered with the server private key.

Then, the equipment information transfer part 116 sends, in step S313, to the center server 40 a message indicating that "data will be sent thereafter with the common key" and an SSL authentication completion message. Then, the center server 40 sends, in step S314, to the equipment information transfer part 116 the message indicating that "data will be sent thereafter with the common key" and the SSL authentication completion message. Thereafter, in step S314, an enciphered communication is started. Thus, the equipment information transfer part 116 sends the equipment information to the center server 40 by the enciphered communication. Accordingly, if the correct individual certificate package 117 is not introduced in the PC 10, the authentication indicated in FIG. 8 is not passed, and subsequent communication cannot be performed. That is, the transfer of the equipment information can be carried out under the condition that the activation with respect to the equipment information notification program 11 is completed successfully and the individual certificate package is introduced.

The process of FIG. 8 achieves the mutual authentication according to the theory in that if the center server 40 is a false server other than the owner of the certificate, the pre-master secret code sent from the equipment information transfer part 116 cannot be deciphered because the false server does not have the private key, and if the equipment information transfer part 116 is a false client other than the owner of the certificate, the signature by the client cannot be checked.

In the meantime, there may be a case where it is desired to install the equipment information notification program 11 to a different PC 10 without purchasing a new license due to a failure in the PC 10 into which the individual certificate package 117 has been introduced or other reasons regarding a business or operations. A description is given below of a process procedure executed in such a case.

Figure 9:
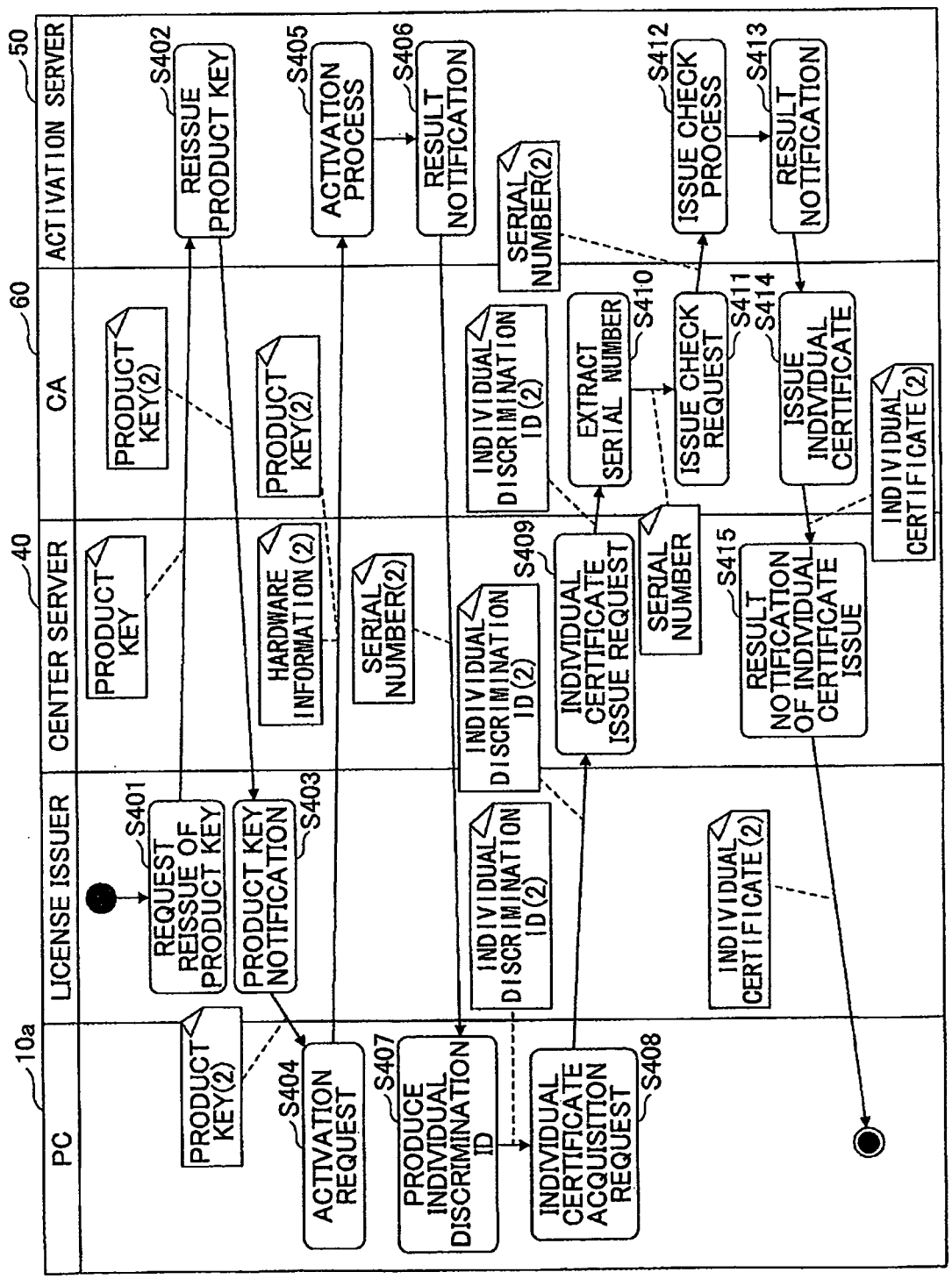
FIG. 9 is an illustration for explaining a first process procedure in a case where the same license is applied to a different PC.

FIG. 9 is an illustration for explaining a first process procedure in a case where the same license is applied to a different PC.

In this case, a user (user in the user site of the equipment 20) requests an issue of a different product key with respect to the license which was already purchased (reissue of the product key). At this time, the license issuer is notified of the already issued product key with respect to the license concerned (old product key). Upon reception of the old product key from an operator, the computer of the license issuer sends, in step S401, a reissue request of the product key together with the old product key to the activation server 50.

Then, the activation server 50 produces a new product key to be replaced with the old product key, and sends, in step S402, the produced (reissued) product key to the computer of the license issuer. In association with the reissue of the product key, the activation server 50 sets an invalid flag corresponding to the old product key to ON in the activation managed table 51. By setting the invalid flag to ON, the product key concerned is invalidated. Thereafter, the activation request based on the old product key will be rejected.

Then, in step S403, the license issuer notifies the user site of the product key reissued to the user site of the equipment 20.

Thereafter, the PC 10a to which the equipment information notification program 11 is newly installed is used, and a process procedure the same as the process procedure explained with reference to FIG. 4 is executed in steps S404 to S415. Accordingly, a new serial number is issued in step S405, and a new individual certificate package 117 is issued in step S414.

If the equipment information transfer part 116 tries to transfer the equipment information by using the old individual certification package in the PC 10 having the old product key, the activation server 50 replies that the execution is not permitted based on the fact that the old product key is invalidated. Accordingly, the transfer of the equipment information based on a license violation is prevented.

Figure 10:
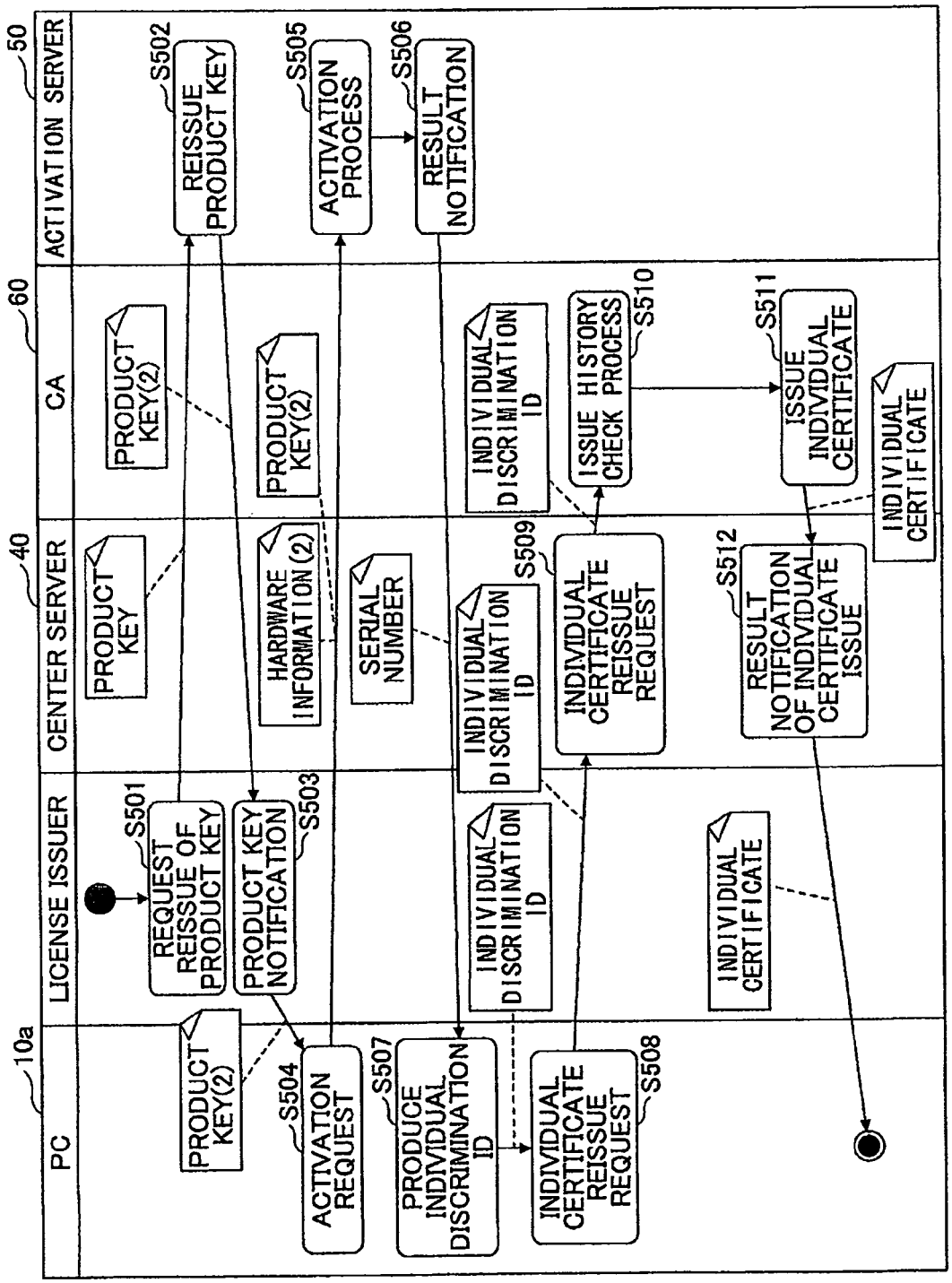
FIG. 10 is an illustration for explaining a second process procedure in a case where the same license is applied to a different PC.

Moreover, a process illustrated in FIG. 10 may be performed instead of the process illustrated in FIG. 9. FIG. 10 is an illustration for explaining a second process procedure in a case where the same license is applied to a different PC.

The reissue process (steps S501 to S503) of the product key is almost the same as the process of steps S401 to S403. However, in step S502, the activation server 50 not only invalidates the old product key but also saves correspondence information of the reissued product key (new product key) and the old product key in the memory device.

Then, the activation request part 113 of the PC 10a sends, in step S504, an activation request (use application) of the equipment information notification program 11 together with the new product key and the hardware information of the PC 10a to the activation server 50. The activation server 50 performs, in step S505, the activation process based on the new product key and the hardware information. At this time, the activation server 50 does not produce a new serial number with respect to the new product key, and relates a serial number registered with respect to the old product key related to the new product key to the new product key in the activation management table 51 in step S505. Accordingly, the activation server 50 returns, in step 505, a serial number the same as the serial number with respect to the old product key.

The process of steps S507 to S509 is the same as the process of steps S407 to S409 of FIG. 9. However, in step S507, the individual certificate request part 114 explicitly requests reissue of the individual certificate package 117. Accordingly, the reissue request is sent to the CA 60. Upon reception of the reissue request, the CA 60 determines whether the received individual discrimination ID is registered in the certificate issue history list 61 (refer to FIG. 7). If the individual discrimination ID is registered in the certificate issue history list 61, the CA 60 produces an individual certificate package 171 without inquiry to the activation server 50, and sends, in step S511, the produced individual certificate package 171 to the center server 40. That is, in FIG. 10, the individual ID to which the individual certificate package 171 is once issued is regarded as the correct and valid one. Accordingly, there is no need to make an inquiry by the CA 60 to the activation server 50, and, thereby, the issue process of the individual package 171 can be simplified. The process thereafter is the same as the process illustrated in FIG. 4.

As mentioned above, in the equipment information monitoring system according to the first embodiment, the individual certificate package 171 is issued appropriately by the association of the activation server 50 and the CA 60. That is, a unique serial number is assigned to the set of the product key and the hardware information in the activation server 50. Additionally, the CA 60 makes an inquiry about the correctness or validity of the license based on the serial number in response to the issue request of the individual certificate package 171, and issues the individual certificate package only when the correctness or validity of the license is confirmed. Accordingly, the individual certificate package 171 associated with the PC 10 can be issued appropriately. As a result, it is possible to make an individual discrimination of each PC 10 (each equipment information notification program).

A description will be given below of a second embodiment. The description mentioned below is focused on differences between the first embodiment and the second embodiment.

Figure 11:
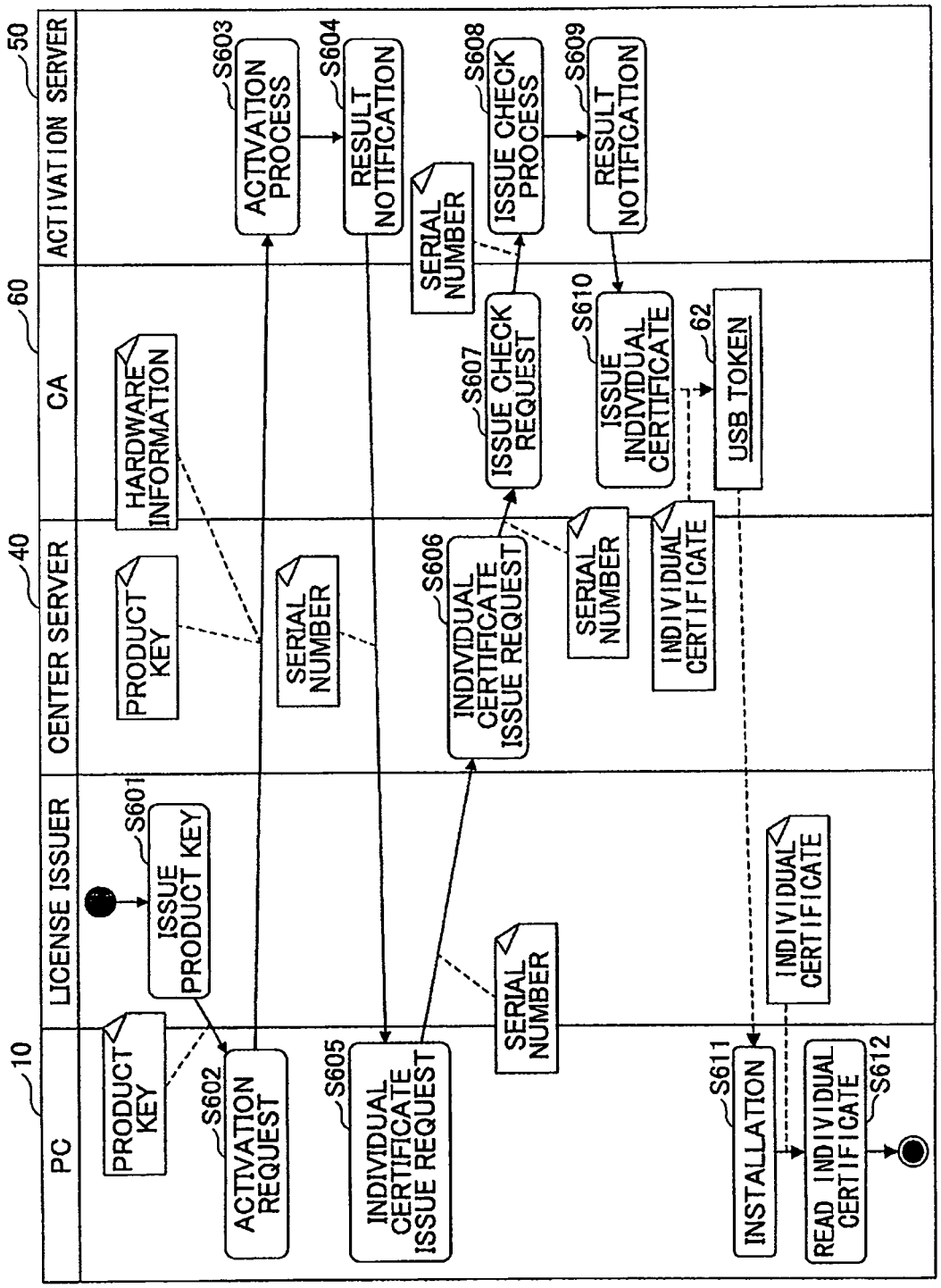
FIG. 11 is an illustration for explaining an issue process of an individual certificate in the second embodiment.

FIG. 11 is an illustration for explaining an issue process of an individual certificate in the second embodiment.

In FIG. 11, the process of steps S601 to S609 is the same as the process of steps S101 to S111 of FIG. 4. However, in step S605, the individual certificate request part 114 of the PC 10 does not send an individual discrimination ID but a serial number in the issue request of the individual certificate package 171. That is, the individual discrimination ID is not produced, and the CA 60 is notified of the serial number in step S605. Accordingly, the CA 60 does not need to perform extraction of the serial number from the individual discrimination ID.

Also in the first embodiment, the production of the individual discrimination ID is not essential, and the issue request of the individual certificate package 171 may be performed based on the serial number.

If it is confirmed by the activation server 50 that the serial number is one which has been issued, the CA 60 generates, in step S610, the individual certificate package 171 and records the individual certificate package 171 on a USB token 62 connected to a USB port (USB connector) of the CA 60.

Therefore, the individual certificate package 171 is delivered to the user site of the equipment 20 through the USB token 62 used as a medium.

If the USB token 62 is connected to the USB port of the PC 10, the individual certificate request part 114 reads, in step S612, the individual certificate package 171 from the USB token 62 and saves it in the HDD 102. However, the individual certificate package 171 may be continuously saved in the USB token 62 without saving it in the HDD 102. In such a case, the USB token 62 needs to be connected to the PC 10 at the time of executing the process.

Also according to the second embodiment, the individual certificate package 171 can be issued securely. The recording medium for delivering the individual certificate package 171 is not limited to the USB token 62, and a recording medium having portability may be used, such as, for example, a USB memory or a CD-ROM.

A description will be given below of a third embodiment. In the third embodiment, the functions of the CA 60 and the activation server 50 are mounted on a portable recording medium having an IC chip (a CPU, a memory, etc.) therein. In the third embodiment, a USB token is used as a portable information processing device.

Figure 12:
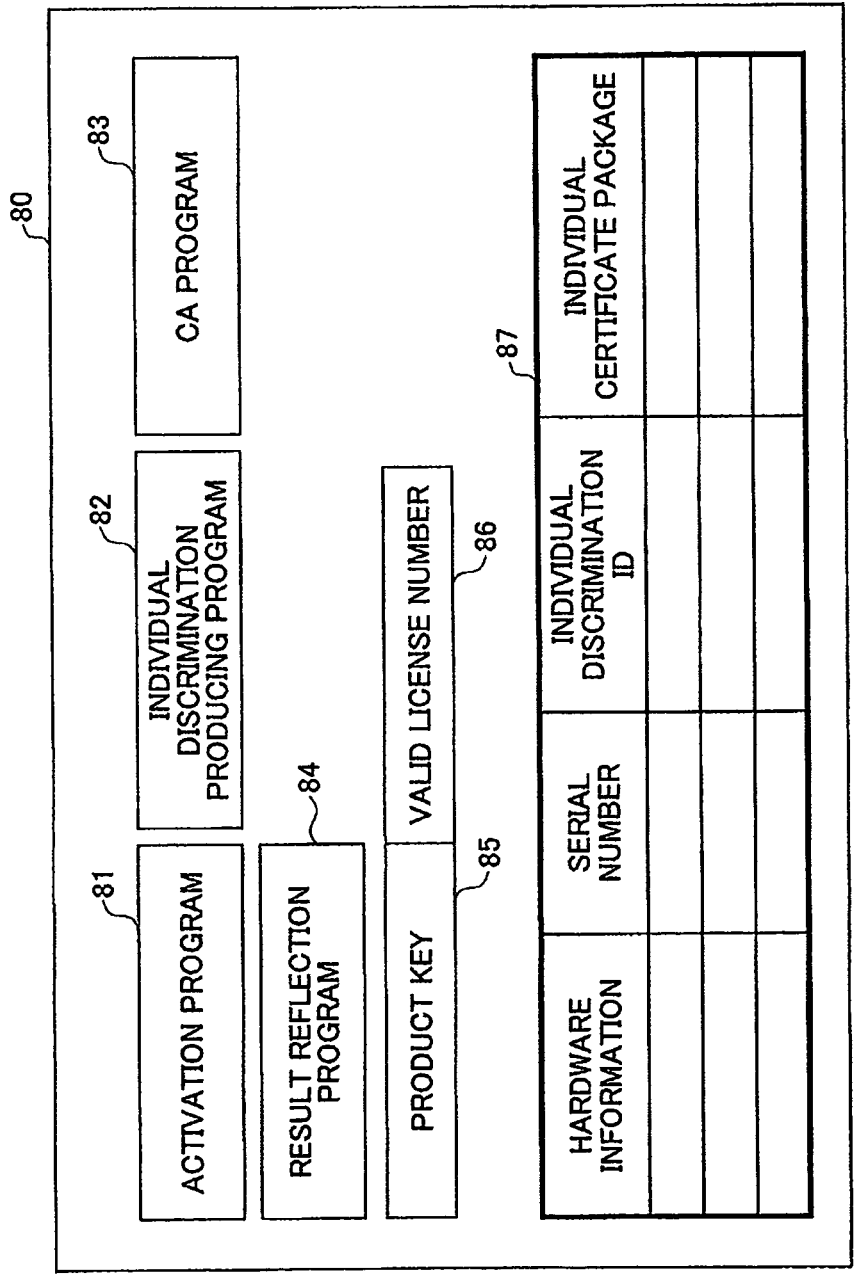
FIG. 12 is an illustration of a structure of a USB token in a third embodiment.

FIG. 12 is an illustration of a structure of the USB token in the third embodiment. In FIG. 12, four programs and data are recorded on the USB token 80. The four programs include an activation program 81, an individual discrimination ID producing program 82, a CA program 83 and a result reflection program 84. The data includes a product key 85, a valid license number 86 and management table 87.

The activation program 81 realizes the function of the activation server 50 in a simple manner. The individual discrimination ID producing program 82 produces the individual discrimination ID. The CA program 83 realizes the function of the CA 60 in a simple manner. The result reflection program 84 reflects the process contents executed by the activation program 81 and the CA program 83 in the activation server 50 and the CA 60.

The product key 85 is a product key issued by the license issuer. The valid license number 86 is a number of licenses set to the product key 85. That is, FIG. 12 illustrates a state after the product key was issued. If the number of licenses is fixed to 1 or a predetermined number, the valid license number 86 is not necessarily recorded on the USB token 80.

The managed table 87 is a table for managing hardware information, the serial number, and the individual discrimination ID for each individual certificate package 171, which has been issued. Accordingly, the managed table 87 is empty at the time of the initial stage (a state where no individual certificate package 171 has been issued using the USB token 80).

Figure 13:
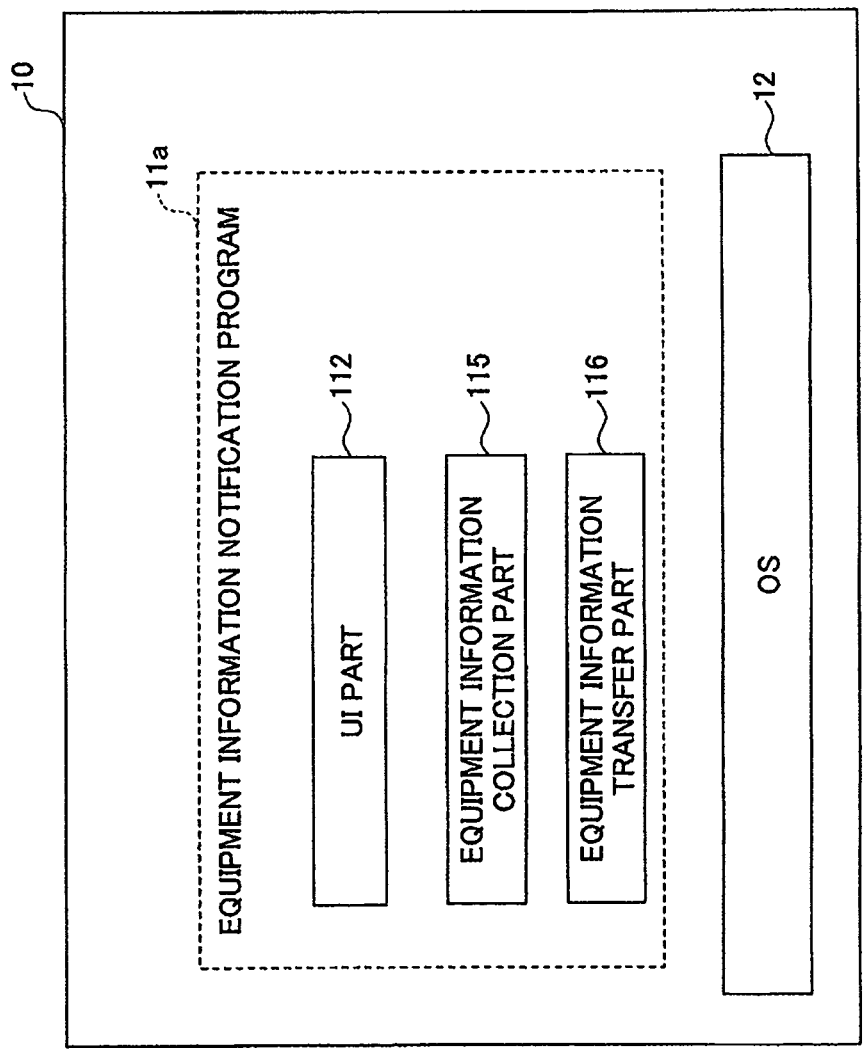
FIG. 13 is an illustration of a functional structure of the PC in the third embodiment.

FIG. 13 is an illustration of a functional structure of the PC in the third embodiment. In FIG. 13, parts that are the same as the parts illustrated in FIG. 3 are given the same reference numerals, and descriptions thereof will be omitted.

As illustrated in FIG. 13, the equipment information notification program 11a does not have the activation request part 113 and the individual certificate request part 114. Thus, the structure of the equipment information notification program 11a is simplified in the third embodiment.

Figure 14:
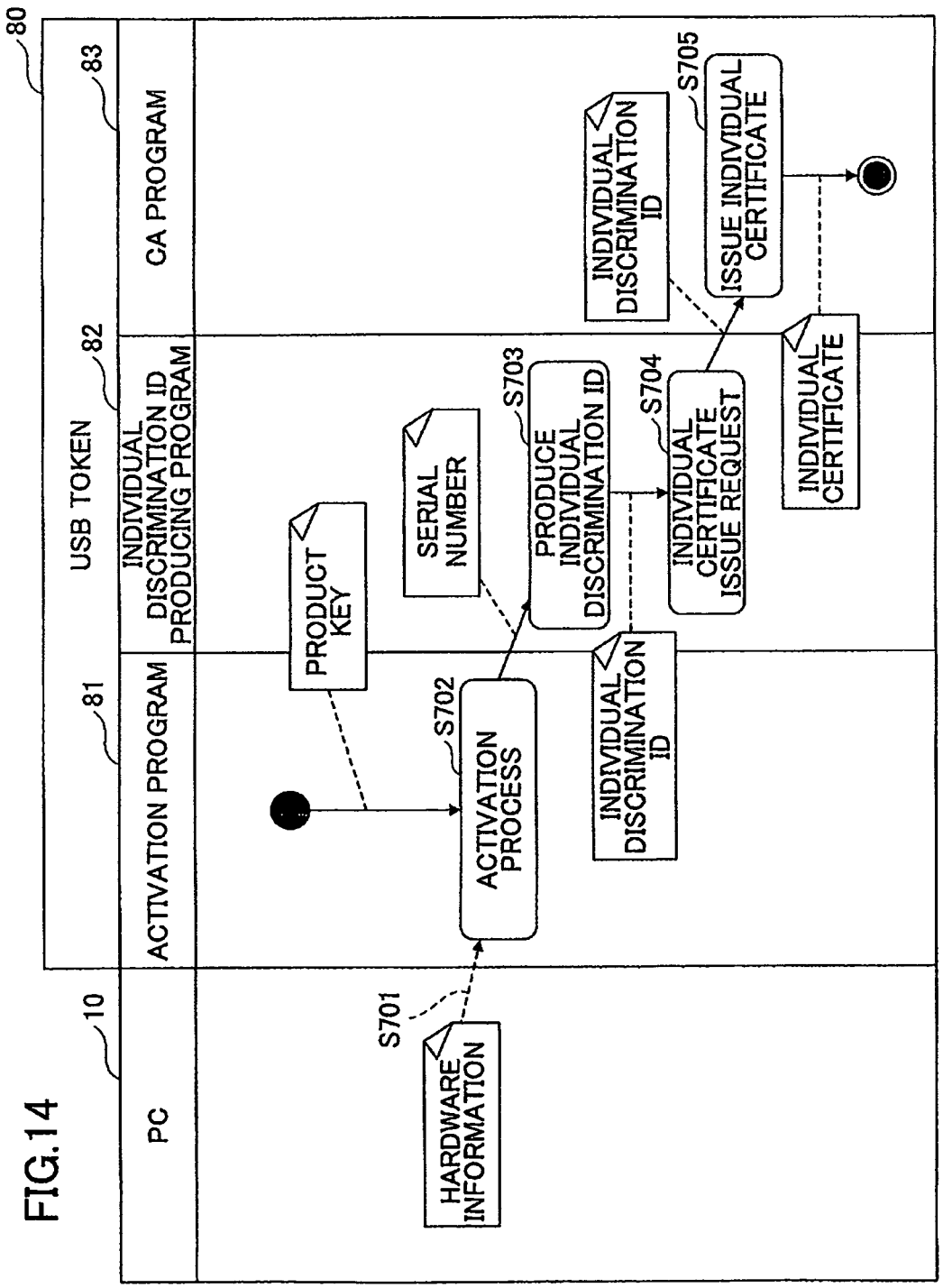
FIG. 14 is an illustration for explaining an issue process of the individual certificate package in the third embodiment.

A description is given below of a process procedure. FIG. 14 is an illustration for explaining an issue process of the individual certificate package in the third embodiment. In FIG. 14, the activation program 81, the individual discrimination ID producing program 82 and the CA program 83 cause an IC chip provided in the USB token 80 to execute their processes, respectively.

When the USB token 80 is connected to the USB port of the PC 10, the activation program 81 reads, in step S701, hardware information from the PC 10. The hardware information may be directly read from the PC 10 or may be input from the equipment information notification program 11a. Then, the activation program 81 performs, in step S702, the activation process based on the product key 85 and the hardware information. Specifically, it is checked whether a number of records registered in the management table 87 has reached the valid licenses number 86 and whether the hardware information acquired from the PC 10 has been already registered in the management table 87. If a number of records registered in the management table 87 has not reached the valid licenses number 86 and the hardware information acquired from the PC 10 has not been registered in the management table 87, the activation program 81 produces a serial number unique to the set of the hardware information and the product key 85. Then, the activation program 81 registers the hardware information and the serial number in the management table 87, and notifies the individual discrimination producing program 82 of the serial number.

Then, the individual discrimination ID producing program 82 acquires, in step S703, the model ID from the equipment information notification program 11a and produces the individual discrimination ID based on the model ID and the serial number. The individual discrimination ID producing program registers the produced individual discrimination ID in the management table 87 by relating the produced individual discrimination ID to the serial number. Then, the individual discrimination ID producing program 82 requests, in step S704, the CA program 83 to issue the individual certificate package 171 of the CA program 83 based on the individual discrimination ID.

The CA program produces, in step S705, the unique individual certificate package 171 for each individual discrimination ID and registers the individual certificate package 171 in the management table 87 by relating the individual certificate package 171 to the management table 87.

Figure 15:
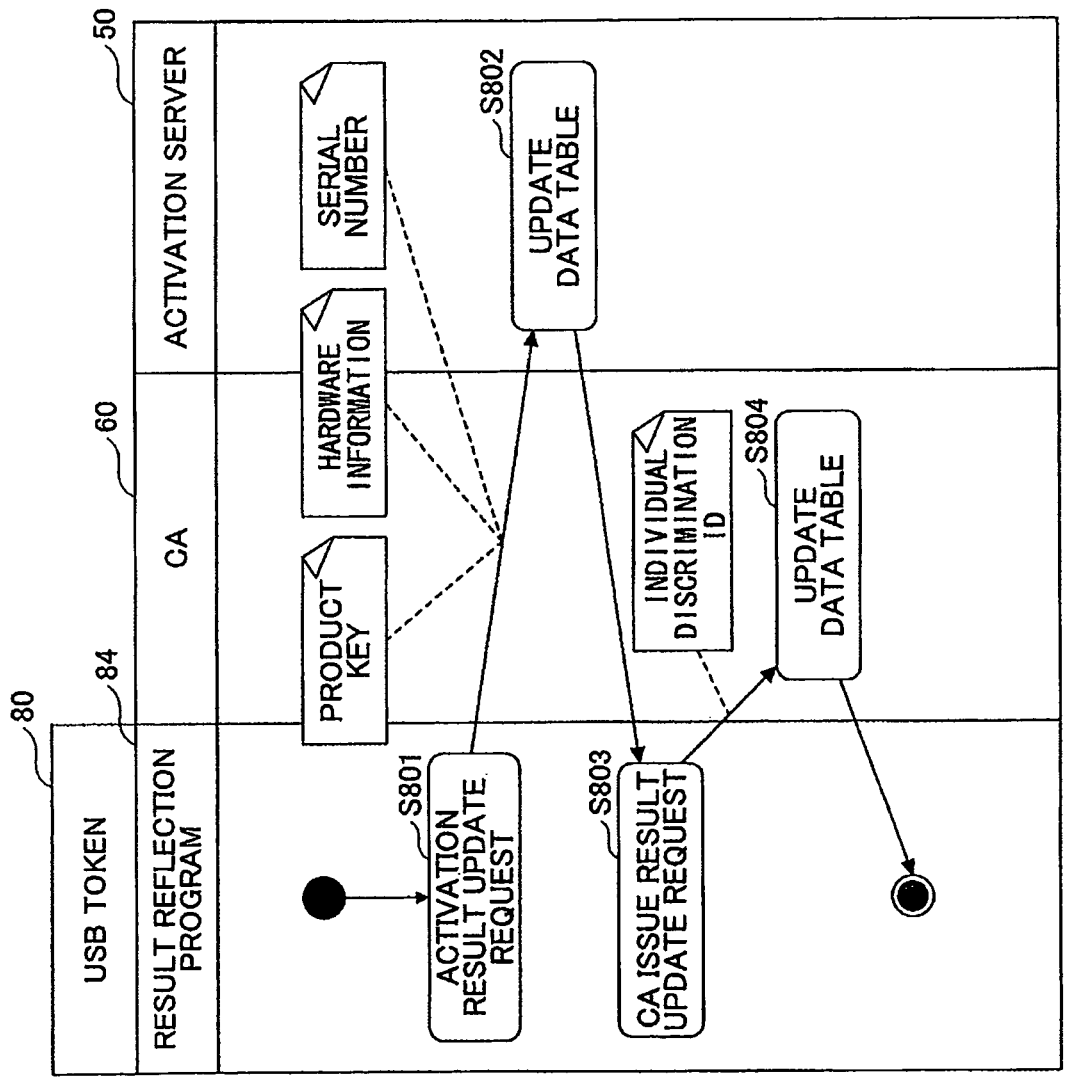
FIG. 15 is an illustration for explaining a reflecting process of a result of a process in the USB token.

The following process is performed in response to the issue of the individual certificate package 171. FIG. 15 is an illustration for explaining the reflecting process of a result of the process in the USB token.

The result reflection program 84 sends, in step S801, the hardware information and the serial number registered in the management table 87 as a result of the simplified activation process to the activation server 50 through the PC 10.

The activation server 50 registers, in step S802, the received product key 85, the received hardware information, and the received serial number in the activation management table 51 by relating them to each other. Thereby, the result of the simplified activation process is reflected in the activation server 50.

Then, the reflection program 84 sends, in step S803, the individual discrimination ID newly registered in the management table 87 to the CA 60 through the PC 10. The CA 60 registers, in step S304, the received individual discrimination ID in the certificate issue history list 61. Thereby, the result of the simplified issue process of the individual certificate package 171 is reflected in the CA 60.

The identification information (for example, each IP address, host name, URL, etc.,) for communication with the activation server 50 and the CA 60 may be recorded in the USB token 80, or may be used by reading it from an external part (information currently retained by the equipment information notification program 11a).

By the process of FIG. 14 and FIG. 15 being performed in the user site of the equipment 20 using the single USB token 80, the individual certificate package 171 associated with each PC 10 can be introduced while appropriately preventing license violation.

The equipment information transfer part 116 of the PC 10 uses the individual certificate package 117 corresponding to the hardware information of the PC 10 by reading the individual certificate package 117 from the USB token 60 each time transferring the equipment information. That is, the USB token 80 continuously stores the individual certificate package 117. Therefore, the USB token 80 must be connected when executing the process.

However, if the individual certificate package 171 can be retained securely in the PC 10, the individual certificate package 171 may be imported from the USB token 80 to the side of the equipment information notification program 11a (a memory device of the PC 10). In such a case, there is no need to connect the USB token 80 to the PC 10 at the time of executing the process.

Moreover, for example, in a case where a volume license is used, which includes two or more (a plurality of) valid license numbers 86, the single USB token 80 may be used with a plurality of PCs 10 as a simplified individual certificate setting tool.

Moreover, the process of FIG. 15 may be carried out asynchronously with the process of FIG. 14. That is, after the process of FIG. 14 is carried out for a plurality of PCs 10 using the same USB token 80, the USB token 80 may be connected to other PCs to carry out collectively the process of FIG. 15 for a plurality of PCs 10. For example, it is possible for a maintenance service person to carry out the process of FIG. 14 for the PCs 10 corresponding to the number of valid licenses in the user site of the equipment 20 and, after return to the office, carry out the process of FIG. 15. In this case, the USB token 80 needs to be also distributed to the user site.

As mentioned above, according to the third embodiment, due to the program mounted on the USB token 80, the issue procedure of the individual certificate, which needs association of the activation server 50 and the CA 60, can be performed in a simplified manner.

It should be noted that a recording medium such as a USB memory device having no IC chip or other portable recording media may be used instead of the USB token 80. In such a case, each program in the recording media may be loaded to a memory of the PC 10 and cause the PC 10 to perform a process procedure thereof.

The present invention is not limited to the specifically disclosed embodiments, and variations and modifications may be made without departing from the scope of the present invention.

The present application is based on Japanese priority application No. 2008-107890 filed on Apr. 17, 2008, the entire contents of which are hereby incorporated herein by reference.

What is claimed is:

1. An electronic certificate issue system comprising:
 a license authentication apparatus including
  a first computer processor, wherein the first computer processor executes a first program to implement:
   a registration part that receives a license key of an issued license of a second program for performing a communication using a private key and a public key, and identification information of a computer to use the second program, wherein the license key is unique to the issued license and issued by an issuer of the issued license, and the registration part produces a serial number unique to the license key and the identification information of the computer, and registers the license key, the identification information of the computer, and the serial number in a management part by associating the serial number with the license key and the identification information of the computer, when an authentication of the issued license corresponding to the license key is successfully completed; and
   a serial number sending part that transmits the produced serial number;
 an electronic certificate issue apparatus including
  a second computer processor, wherein the second computer processor executes the first program to implement:
   a checking part that receives the serial number and checks whether the serial number is registered in the management part; and
   a certificate producing part that produces, when the serial number is registered in the management part, an individual certificate package containing the private key and the public key which is unique to the serial number; and
 an apparatus including
  a third computer processor, wherein the third computer processor executes the first program to implement
   a certificate request part that produces an individual discrimination ID by performing a reversible conversion on the serial number and a model ID given to the second program, and sends the produced individual discrimination ID,
 wherein the checking part receives the serial number by extracting the serial number from the individual discrimination ID.

2. The electronic certificate issue system according to claim 1, wherein the second computer processor executes the first program to further implement a certificate returning part that returns the individual certificate package produced by the certificate producing part to a sender of the serial number.

3. The electronic certificate issue system according to claim 1, wherein said electronic certificate issue apparatus further includes a recording part that records the individual certificate package produced by the certificate producing part on a portable recording medium.

4. The electronic certificate issue system according to claim 1, wherein said electronic certificate issue apparatus further includes a recording part that records the serial number to which the individual certificate package is produced in a memory device, and wherein, when the serial number is recorded in the memory device, the checking part does not perform checking registration of the serial number and the certificate producing part produces the individual certificate package.

5. An electronic certificate issue method comprising:
 receiving, by a license authentication apparatus, a license key of an issued license of a program for performing a communication using a private key and a public key, and identification information of a computer to use the program, wherein the license key is unique to the issued license and issued by an issuer of the issued license;
 producing, by the license authentication apparatus, a serial number unique to the license key and the identification information of the computer, and registering, by the license authentication apparatus, the license key, the identification information of the computer, and the serial number in a management part by associating the serial number with the license key and the identification information of the computer, when an authentication of the issued license corresponding to the license key is successfully completed;
 transmitting, by the license authentication apparatus, the produced serial number;

receiving the serial number and checking whether the serial number is registered in the management part, by an electronic certificate issue apparatus;

producing, by the electronic certificate issue apparatus, an individual certificate package containing the private key and the public key which is unique to the serial number, when the serial number is registered in the management part;

producing, by an apparatus, an individual discrimination ID by performing a reversible conversion on the serial number and a model ID given to the second program; and sending, by the apparatus, the produced individual discrimination ID, wherein said receiving the serial number includes extracting, by the electronic certificate issue apparatus, the serial number from the individual discrimination ID.

6. The electronic certificate issue method according to claim 5, further comprising returning, by the electronic certificate issue apparatus, the produced individual certificate package to a sender of the serial number.

7. The electronic certificate issue method according to claim 5, further comprising recording, by the electronic certificate issue apparatus, the produced individual certificate package on a portable recording medium.

8. The electronic certificate issue method according to claim 5, further comprising recording, by the electronic certificate issue apparatus, the serial number to which the individual certificate package is produced in a memory device, and wherein, when the serial number is recorded in the memory device, the individual certificate package is produced without the electronic certificate issue apparatus checking registration of the serial number.

9. A non-transitory storage medium storing a computer readable program for causing a computer to execute an electronic certificate issue process, the electronic certificate issue process comprising:

receiving, by a license authentication apparatus, a license key of an issued license of a program for performing a communication using a private key and a public key, and identification information of a computer to use the program, wherein the license key is unique to the issued license and issued by an issuer of the issued license;

producing, by the license authentication apparatus, a serial number unique to the license key and the identification information of the computer, and registering, by the license authentication apparatus, the license key, the identification information of the computer, and the serial number in a management part by associating the serial number with the license key and the identification information of the computer, when an authentication of the issued license corresponding to the license key is successfully completed;

transmitting, by the license authentication apparatus, the produced serial number;

receiving the serial number and checking whether the serial number is registered in the management part, by an electronic certificate issue apparatus;

producing, by the electronic certificate issue apparatus, an individual certificate package containing the private key and the public key which is unique to the serial number, when the serial number is registered in the management part;

producing, by an apparatus, an individual discrimination ID by performing a reversible conversion on the serial number and a model ID given to the second program; and sending, by the apparatus, the produced individual discrimination ID, wherein said receiving the serial number includes extracting, by the electronic certificate issue apparatus, the serial number from the individual discrimination ID.

10. The non-transitory storage medium according to claim 9, wherein the electronic certificate issue process further comprises returning, by the electronic certificate issue apparatus, the produced individual certificate package to a sender of the serial number.

11. The non-transitory storage medium according to claim 9, wherein the electronic certificate issue process further comprises recording, by the electronic certificate issue apparatus, the produced individual certificate package on a portable recording medium.

12. The non-transitory storage medium according to claim 9, wherein the electronic certificate issue process further comprises recording, by the electronic certificate issue apparatus, the serial number to which the individual certificate package is produced in a memory device, and wherein, when the serial number is recorded in the memory device, the individual certificate package is produced without the electronic certificate issue apparatus checking registration of the serial number.

* * * * *